US006496917B1

(12) United States Patent
Cherabuddi et al.

(10) Patent No.: US 6,496,917 B1
(45) Date of Patent: Dec. 17, 2002

(54) METHOD TO REDUCE MEMORY LATENCIES BY PERFORMING TWO LEVELS OF SPECULATION

(75) Inventors: Rajasekhar Cherabuddi, Cupertino, CA (US); Kevin B. Normoyle, Santa Clara, CA (US); Brian J. McGee, San Jose, CA (US); Meera Kasinathan, Sunnyvale, CA (US); Anup Sharma, Santa Clara, CA (US); Sutikshan Bhutani, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/499,264

(22) Filed: Feb. 7, 2000

(51) Int. Cl.[7] .............................................. G06F 12/00

(52) U.S. Cl. ...................... 711/204; 711/120; 711/167; 711/169

(58) Field of Search ................................ 711/167, 169, 711/120, 204

(56) References Cited

U.S. PATENT DOCUMENTS 5,355,467 A * 10/1994 MacWilliams et al. ..... 711/146
5,761,708 A * 6/1998 Cherabuddi et al. .......... 710/57
5,944,810 A 8/1999 Cheraubbi .................. 712/23
6,098,154 A * 8/2000 Lopez-Aguado et al. ... 711/118

* cited by examiner

*Primary Examiner*—Reba I. Elmore
(74) *Attorney, Agent, or Firm*—William L. Paradice, III

(57) ABSTRACT

A multiprocessor system includes a plurality of central processing units (CPUs) connected to one another by a system bus. Each CPU includes a cache controller to communicate with its cache, and a primary memory controller to communicate with its primary memory. When there is a cache miss in a CPU, the cache controller routes an address request for primary memory directly to the primary memory via the CPU as a speculative request without access the system bus, and also issues the address request to the system bus to facilitate data coherency. The speculative request is queued in the primary memory controller, which in turn retrieves speculative data from a specified primary memory address. The CPU monitors the system bus for a subsequent transaction that requests the specified data in the primary memory. If the subsequent transaction requesting the specified data is a read transaction that corresponds to the speculative address request, the speculative request is validated and becomes non-speculative. If, on the other hand, the subsequent transaction requesting the specified data is a write transaction, the speculative request is canceled.

19 Claims, 6 Drawing Sheets

METHOD TO REDUCE MEMORY LATENCIES BY PERFORMING TWO LEVELS OF SPECULATION

BACKGROUND

1. Field of Invention

This invention relates generally to superscalar processors, and specifically to improving memory latencies of superscalar processors in multi-processor systems.

2. Description of Related Art

Modern computer systems utilize a hierarchy of memory elements in order to realize an optimum balance between the speed, size, and cost of computer memory. These computer systems typically employ a Dynamic Random Access Memory (DRAM) as primary memory and include a larger, but much slower, secondary memory such as, for instance, a magnetic storage device or Compact Disc Read Only Memory (CD ROM). A small, fast Static Random Access Memory (SRAM) cache memory is typically provided between the central processing unit (CPU) and primary memory. This fast cache memory increases the data bandwidth of the computer system by storing information most frequently needed by the CPU. In this manner, information most frequently requested during execution of a computer program may be rapidly provided to the CPU from the SRAM cache memory, thereby eliminating the need to access the slower primary and secondary memories. Although fast, the SRAM cache memory is very expensive and is therefore typically small to minimize costs.

To further increase performance, high-end computer systems may employ multiple central processing units (CPUs) operating in parallel to allow for the simultaneous execution of multiple instructions of a computer program. FIG. 1 illustrates a non-uniform memory architecture 1 having four CPU blocks 10A–10D each connected to a system bus 11. Referring also to FIG. 2, each CPU block 10 includes a CPU 20, an external or L2 cache 24, and a primary memory 25. The external cache 24 (E$) is typically an SRAM device, and the primary memory 25 is typically a DRAM device. Each CPU 20 includes an external cache controller 21 to interface with its external cache 24, and includes a primary memory controller 22 to interface with its primary memory 25. Each CPU 20 also includes a bus interface unit 23 to interface with the system bus 11. Although not shown for simplicity in FIGS. 1 and 2, each CPU 20 includes an internal or LI cache, which in turn is typically divided into an instruction cache and a data cache. The instruction cache (I$) stores frequently executed instructions, and the data cache (D$) stores frequently used data.

FIG. 1 shows additional devices connected to system bus 11. A secondary memory device 12 such as, for instance, a hard-disk or tape drive, provides additional memory. A monitor 13 provides users a graphical interface with system 1. CPU blocks 10A–10D are connected to a network 14 (e.g., a local area network, a wide area network, a virtual private network, or the Internet) via system bus 11.

During execution of a computer program, the computer program instructs the various CPUs 20 of system 1 to fetch instructions by incrementing program counters within the various CPUs 20 (program counters not shown for simplicity). In response thereto, each CPU 20 fetches instructions identified by the computer program. If an instruction requests data, an address request specifying the location of that data is issued. A corresponding CPU 20 first searches its internal cache for the data. If the specified data is found in the L1 cache, the data is immediately provided to the CPU 20 for processing.

If, on the other hand, the specified data is not found in the internal cache, the external cache 24 is then searched. If the specified data is found in the external cache 24, the data is returned to the CPU 20 for processing. If the specified data is not in the external cache 24, the address request is forwarded to the system bus 11, which in turn provides the address request to the primary memory 25 of each of the various CPUs 20 via respective primary memory controllers 22.

When running a computer program on a multiprocessor system such as system 1 of FIGS. 1 and 2, instructions which write to or read from a specified address may be executed by different CPUs. As a result, it is necessary to monitor instructions assigned to the various CPUs in order to maintain data coherency. For example, if a first instruction executed by CPU block 10A modifies data at a specified address, and a subsequent instruction executed by CPU block 10B reads data at the specified address, the first instruction must be executed before the second instruction since the data requested by the second instruction is modified by the first instruction.

Data coherency is typically maintained in a multiprocessor system such as the system shown in FIGS. 1 and 2 by first issuing all primary memory address requests to the system bus 11, irrespective of whether a particular address request is to the executing CPU's own primary memory (a local request) or to another CPU's primary memory (a remote request). This ensures that instructions are executed by the various CPUs in the order that they were issued to the system bus 11, the order of which presumably mirrors the instruction order of the computer program. Thus, for instance, in response to an external cache miss, a CPU 20 forwards the primary memory address request to the system bus 11. Once issued on the system bus 11, the address request is available to all CPUs 20. The CPU 20 that issued the address request retrieves the address request back from the system bus 11, and thereafter searches its primary memory 25 for the specified data. The other CPUs 20 also monitor the address request issued on the system bus 11 to generate well-known snoop information for the requesting CPU. Snoop information maintains cache consistency between the various CPUs 20 by indicating whether data specified by the address request has been modified while stored in the cache of another CPU 20.

Routing an address request to primary memory 25 via the system bus 11 in response to a cache miss advantageously maintains proper data coherency in a mutiprocessor system. However, routing an address request from a CPU's cache to the CPU's own primary memory 25 via the system bus 11 first requires access to the system bus 11. The multiple connections to the system bus 11 result in a relatively large amount of traffic on the system bus 11, which in turn may cause significant delays in arbitrating access to the system bus 11. These arbitration delays undesirably increase the total latency of primary memory 25. Since primary memory access speeds are not increasing as quickly as are CPU processing speeds, it is becoming increasingly important to reduce primary memory latencies in order to maximize CPU performance. Indeed, it would be highly desirably to improve primary memory latencies in a multiprocessor computer system while preserving data coherency.

SUMMARY

A method is disclosed that reduces memory latencies in a multiprocessor computer system over the prior art. A multiprocessor system includes a plurality of central processing units (CPUs) connected to one another by a system bus. Each CPU includes a cache controller to communicate with its cache, and a primary memory controller to communicate with its primary memory. In accordance with the present invention, when there is a cache miss in a CPU, the cache controller routes an address request for primary memory directly to the primary memory via the CPU as a speculative request, and also issues the address request to the system bus to maintain data coherency. The speculative request is queued in the primary memory controller, and thereafter retrieves speculative data from a specified primary memory address. The CPU monitors the system bus for requests to the specified primary memory address. If a subsequent transaction requesting the specified data is the read request that was issued on the system bus in response to the cache miss, the speculative request and any data retrieved thereby is validated and becomes non-speculative. If, on the other hand, the subsequent transaction requesting the specified data is a write transaction, the speculative request is canceled. The write transaction for the specified data is then processed before the read transaction for the specified data in order to maintain data coherency.

Thus, in contrast to prior art architectures in which access to primary memory commences only after data coherency is established on the system bus, present embodiments, in response to a cache miss, route a speculative address request directly from a CPU's cache controller to its primary memory without arbitrating access to the system bus. By accessing primary memory contemporaneously with system bus arbitration, as opposed to sequentially arbitrating system bus access and then accessing primary memory, present embodiments may reduce primary memory latencies, which in turn improves CPU performance.

BRIEF DESCRIPTION OF THE DRAWINGS

Like reference numerals refer to corresponding parts throughout the drawing figures.

DETAILED DESCRIPTION

Figure 1:
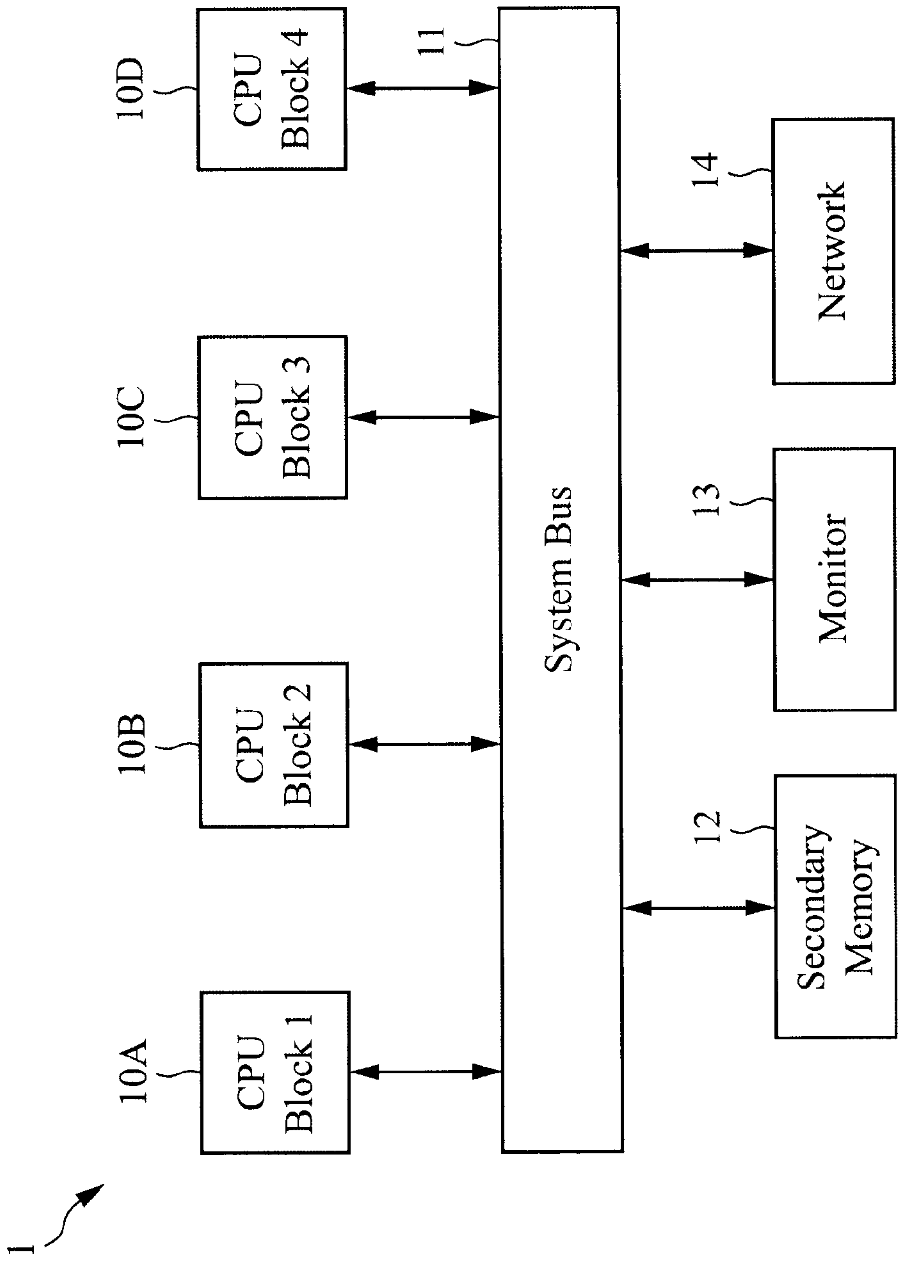
FIG. 1 is a block diagram of a conventional multiprocessor computer system.
Figure 2:
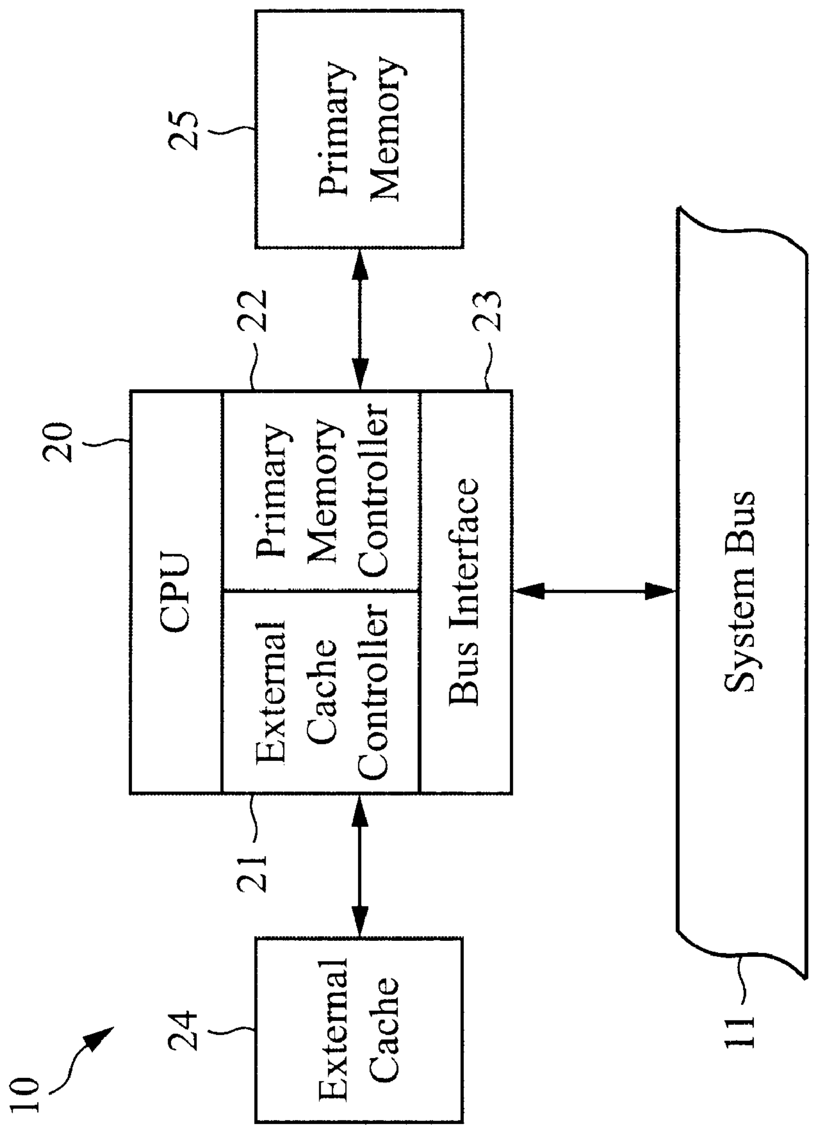
FIG. 2 is a block diagram of a CPU block of the computer system of FIG. 1.
Figure 3:
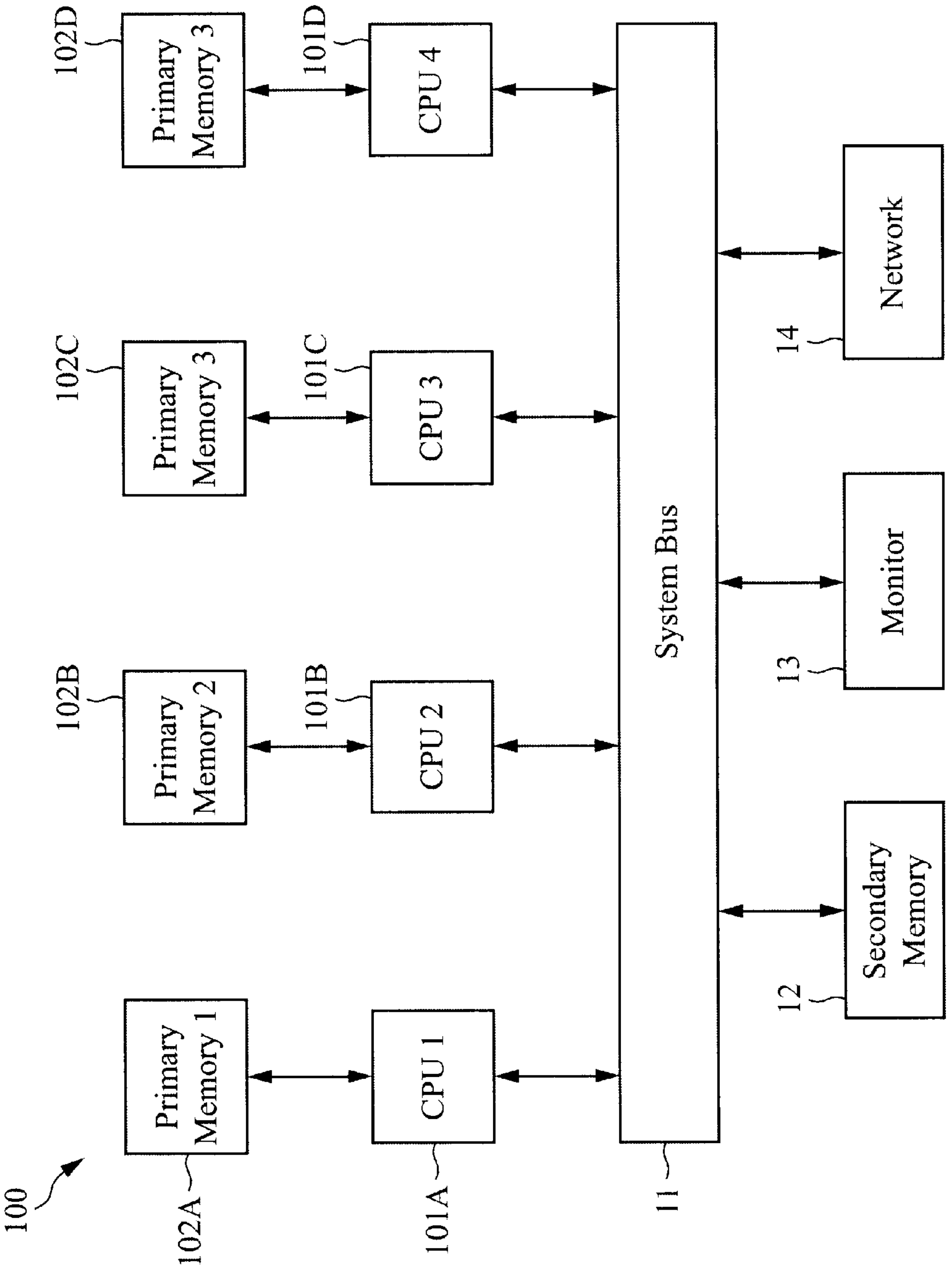
FIG. 3 is a block diagram of a multiprocessor computer system incorporating CPU blocks in accordance with the present invention.

FIG. 3 illustrates a multiprocessor computer system 100 having four CPUs 101A–101D constructed in accordance with the present invention. The CPUs 101A–101D are connected to primary memories 102A–102D, respectively, via dedicated signal lines 103, and to the system bus 1 via signal lines 104. Primary memory 102 is preferably DRAM, although any well-known memory device may be used. System bus 11 provides connections to the secondary memory 12, the monitor 13, and the network 14 in a well-known manner.

Figure 4:
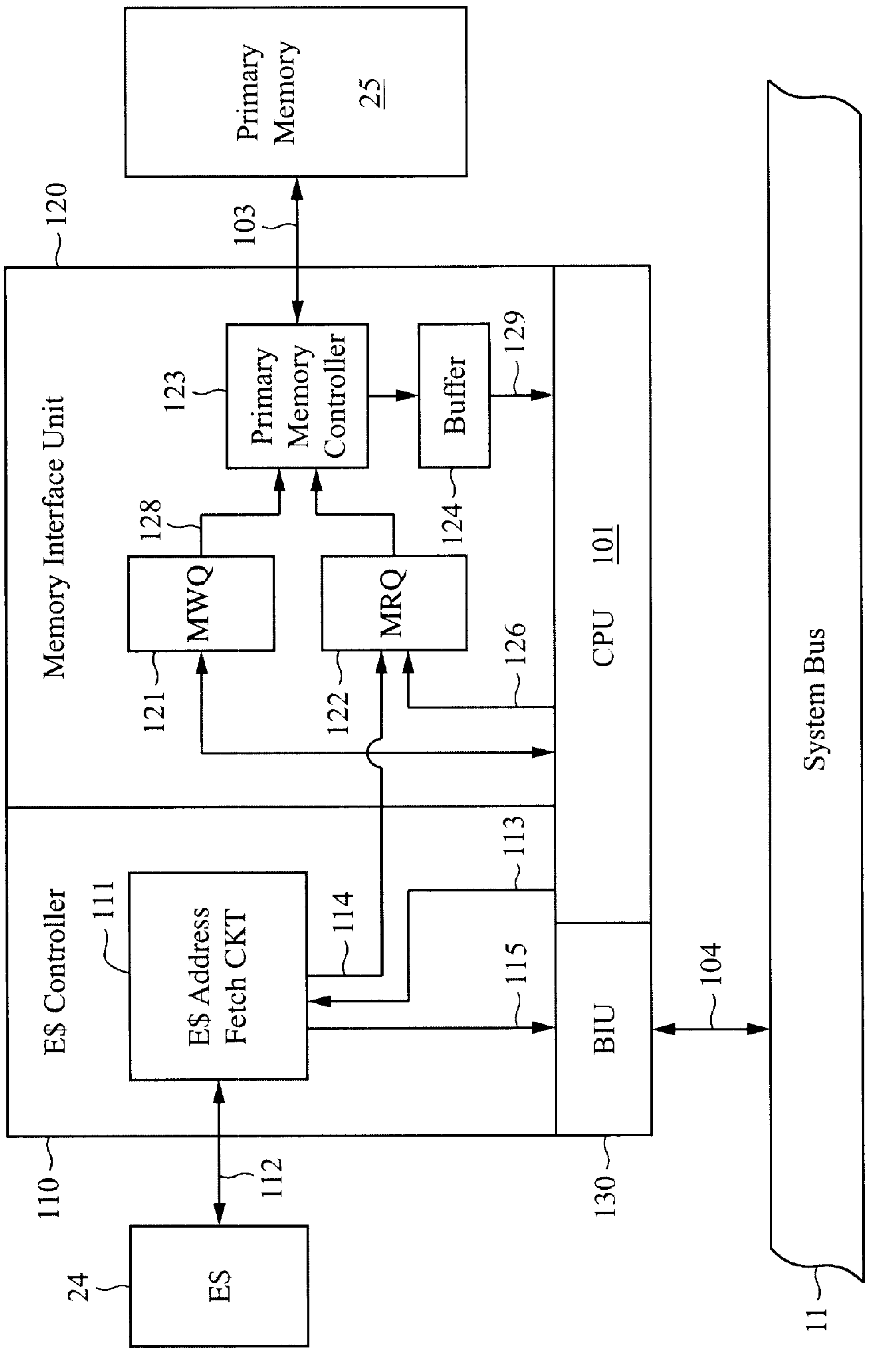
FIG. 4 is a block diagram of a CPU block of the computer system of FIG. 3 in accordance with one embodiment of the present invention.

Referring also to FIG. 4, each CPU 101 includes an external cache (E$) controller 110, a memory interface unit 120, and a bus interface unit 130. External cache controller 110 includes an E$ address fetch circuit 111 to communicate with the external cache 24 via dedicated bus 112. The E$ address fetch circuit 111 queries the external cache 110 for a specified address requested by an instruction executed by the CPU 101. The external cache 24 is preferably an SRAM cache device. Although shown as being external to CPU 101, in some embodiments the external cache 24 may be included on the CPU 101.

The memory interface unit 120 is shown to include a memory write queue (MWQ) 121, a memory read queue (MRQ) 122, a primary memory controller 123, and an output data buffer 124. The MWQ 121 and MRQ 122 are preferably Content addressable Memory-Random Access Memory (CAMRAM) devices. The MWQ 121 communicates with execution units within the CPU 101 via signal line 125, and the MRQ 122 communicates with the CPU execution units via signal line 126 (the CPU execution units are not shown for simplicity). In one embodiment, MWQ 121 stores 4 write requests, and MRQ 122 stores 16 read requests.

Figure 5A:
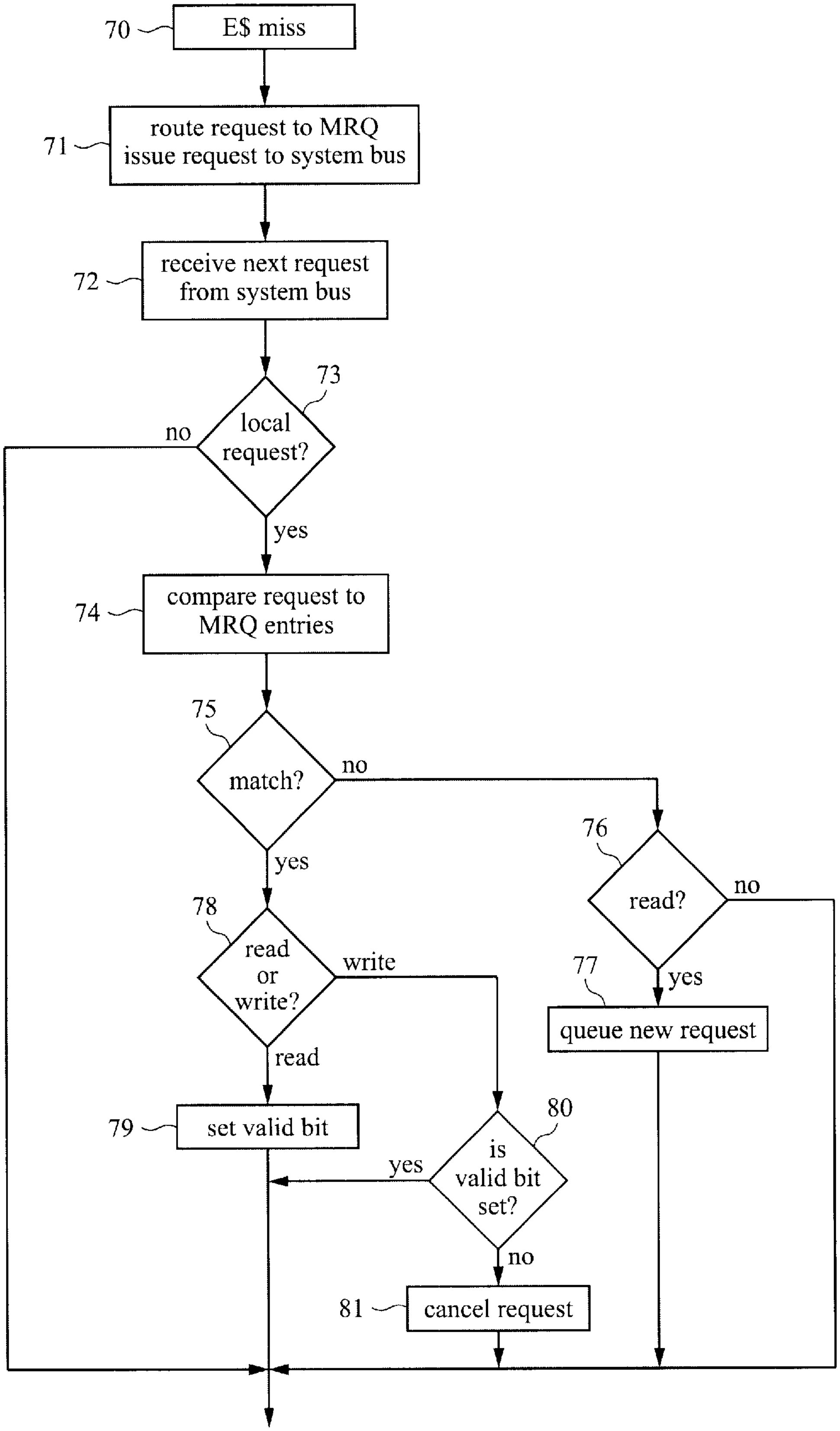
FIG. 5 is a flow chart illustrating he operation of the system of FIG. 4 according to one embodiment of the present invention.
Figure 5B:
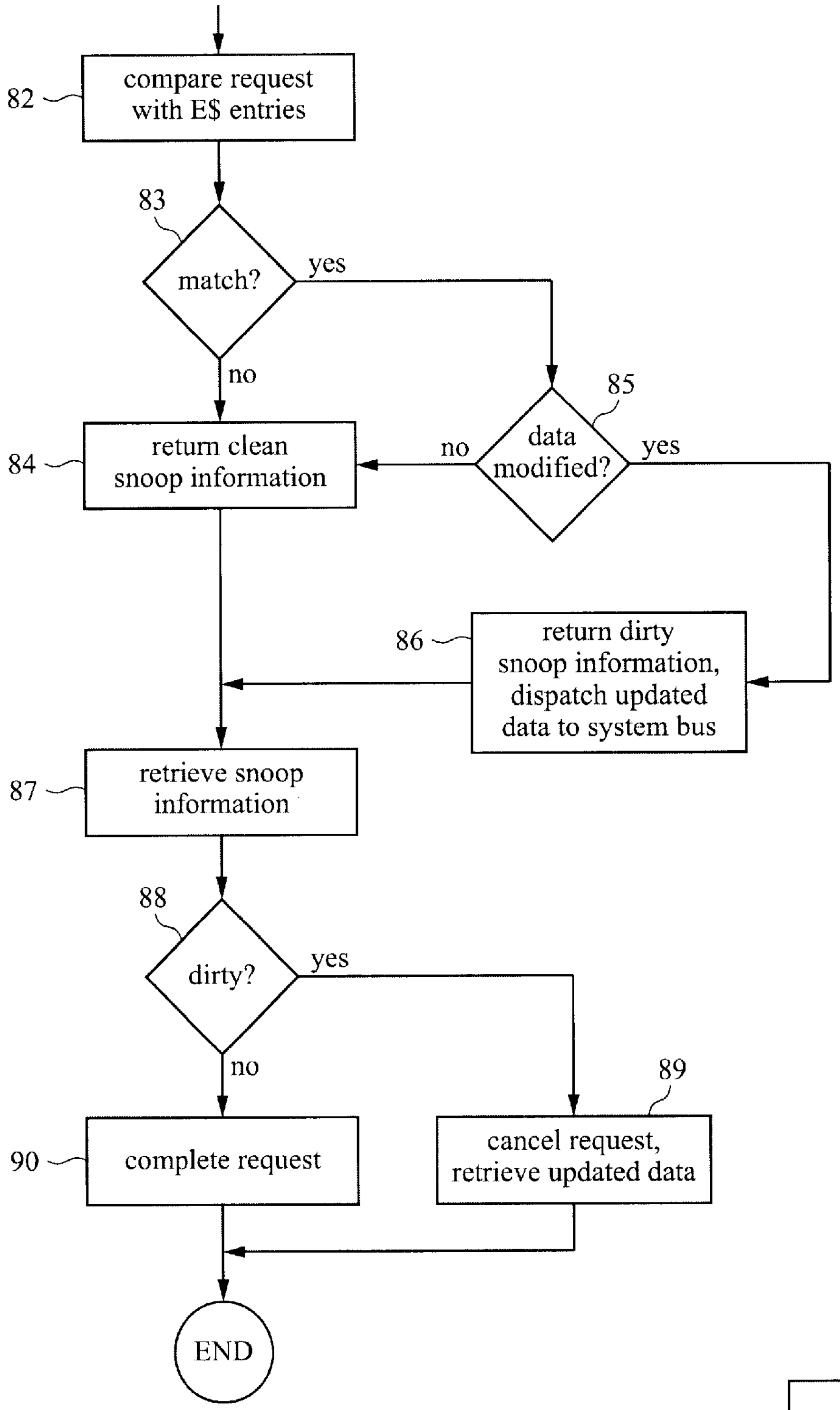
Figure 5:
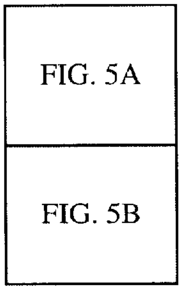

As mentioned above, multiprocessor computer systems simultaneously process multiple instructions of a computer program by delegating execution of the instructions amongst the various CPUs of the system. in accordance with the present invention, the multiprocessor computer system 100 shown in FIGS. 4 and 5 reduces primary memory latencies over prior art multiprocessor architectures by routing speculative address requests directly from the external cache controller 110 to the memory interface unit 120 via the CPU 101 in response to external cache misses. The memory interface unit 120 may begin processing speculative address requests before data coherency information is available from the system bus 11.

In accordance with the present invention, the speculative address requests received directly from the external cache controller 110 are reconciled with data coherency information provided by the system bus 11. Data coherency is maintained on the system bus 11 by issuing all address requests from the external cache controller lie to the system bus 11. Thus, for instance, if a write transaction for a specified address precedes a read transaction to the specified address in the execution order of the computer program, the write transaction is issued to the system bus 11 before the read transaction is issued to the system bus 11, irrespective of whether the two transactions are executed by the same CPU 101 or by different CPUs 101. Thus, the CPUs 101 monitor the system bus 11 for requests corresponding to speculative address requests being processed in respective memory interface units 120. If the CPU 101 receives from the system bus 11 a write request to an address specified by a speculative request, the speculative address request, and any data retrieved thereby, are canceled. If, on the other hand, the CPU 101 receives from the system bus 11 an address request that corresponds to the speculative request before receiving a write-back transaction for the specified address, the speculative request is validated and becomes a non-speculative address request. If speculative data has already been retrieved from primary memory 25, the speculative data is validated, and thereafter processed by the CPU 101 in a conventional manner.

The CPUs 101 also monitor the system bus 11 for snoop information provided by the other CPUs. If the snoop information indicates that specified data in primary memory is stale, all corresponding address requests to primary memory, and any data retrieved thereby, are canceled. The CPU that returns the dirty snoop information then routes updated data to the appropriate CPU 101 via the system bus 11. Conversely, if the snoop information indicates that specified data is clean, the corresponding address request is completed, and data retrieved thereby is thereafter processed in a conventional manner. When this condition occurs, primary memory latency is reduced over prior art multiprocessor computer architectures.

In sum, when there is an external cache miss, the address request is routed directly from the external cache controller 110 to the primary memory interface unit 120 as a speculative address request, thereby avoiding any delays associated with arbitrating access to the system bus 11. Thus, while the address request issued to the system bus 11 waits for access to the system bus 11, its corresponding speculative address request may be processed in the memory interface unit 120. In this manner, present embodiments may overlap primary memory latency with bus arbitration delays to improve CPU performance. Present embodiments achieve maximum performance gains when data corresponding to speculative address requests is retrieved from primary memory as or before bus ordering information and snoop information become available.

The foregoing operations are more fully appreciated with reference to FIG. 5. The first processing step shown in FIG. 5 is the generation of an external cache miss in response to an address request from the CPU (step 70). In some circumstances, the address request is accompanied by a write request, in which case the primary memory controller 120 reads data from primary memory 25 and writes data to primary memory 25. In response to the external cache miss, the external cache address fetch circuit 111 routes the corresponding speculative address request to the memory interface unit 120 via line 114, and also routes the address request to the system bus 11 via line 115 (step 71). As mentioned above, the address request is routed to the system bus 11 to facilitate bus ordering and snooping functions, and the speculative address request is routed directly to and queued within the MRQ 122 to fetch speculative data. The speculative address request, as well as any data retrieved thereby from the primary memory 25, remains speculative until validated by data coherency information provided by the system bus 11. In some embodiments, if the MRQ 122 is full when a speculative address request is received from the external cache controller 110, the speculative address request is dropped.

Once issued on the system bus 11, address requests from the various CPUs 101A–101D are available to all the CPUs 101A–101D. Each CPU 101 receives a subsequent address request from the system bus 11 (step 72). If the request is not to the receiving CPU's own primary memory 25, but rather requests data from another CPU's primary memory, as determined by step 73, processing proceeds to step 82. On the other hand, if the request is to the receiving CPU's own primary memory, i.e., the request is local, the CPU compares the address request with entries stored in its MRQ 122 to maintain data coherency (step 74).

Each address request entry queued in the MRQ 122 has an associated valid bit indicative of whether the address request has been validated by ordering information from the system bus. Thus, speculative address requests received directly from the external cache controller 110 in response to an external cache miss initially have an un-asserted valid bit, while address requests that are consistent with and thus are validated by data coherency information on the system bus 11 have an asserted valid bit.

If there is not a match in the MRQ 122, as tested by step 75, thereby indicating that there is not a corresponding speculative address request, and the received request to local memory is a read transaction, as tested by step 76, the address request is queued in the MRQ 122 (step 77). Here, since the transaction to be queued in the MRQ 122 is received from the system bus 11, rather than from the external cache controller 110, its consistency with bus ordering is validated and, therefore, its valid bit is asserted when queued in the MRQ 122.

If, on the other hand, there is a match in the MRQ 122, and the subsequent address request is a read transaction, as tested by step 78, the valid bit of the matching address request queued in the MRQ 122 is asserted (if not asserted already) to indicate that ordering on the system bus 11 has been verified (step 79). In this manner, speculative address requests received directly from the external cache controller 110 are validated by the matching read transaction received from the system bus 11 to become non-speculative address requests.

If the request to local memory received from the system bus 11 is a write transaction, as tested by step 78, and the valid bit of the matching address request queued in the MRQ 122 is un-asserted to indicate that the queued request is speculative, as tested in step 80, the speculative address request is canceled, and the write transaction is issued to primary memory 25 (step 81). In this manner, the write transaction is issued to primary memory 25 prior to the matching read request to preserve data coherency. On the other hand, if the request queued in the MRQ 122 has an asserted valid bit, thereby indicating that the request has been validated by bus ordering, the queued address request remains queued in the MRQ 122, and processing proceeds to step 82.

It should be noted that the local request is also provided to MWQ 121 via line 125 for comparison with write requests queued in the MWQ 121. If there is a match, the write request queued in the MWQ 121 is immediately dispatched to the primary memory controller 123 to write new data to the specified memory location. This preserves bus ordering.

In a preferred embodiment, each address request issued to the system bus 11 has an associated transaction identification (ID), which in turn indicates which CPU issued the request. In such embodiments, each entry in the MRQ 122 includes a physical address CAM field and a transaction ID RAM field. Speculative address requests routed directly from the external cache controller 110 to the primary memory 25 do not include a transaction ID. When the CPU 101 receives an address request from the system bus 11, the request's transaction ID is used to either validate or to cancel corresponding speculative address requests queued in the 122 in a manner similar to that described above. In some embodiments, each entry in the MRQ 122 includes a snoop-status RAM field for holding snoop information gathered from the system bus 11.

In addition to selectively comparing requests to local memory with entries in its MRQ 122, each CPU 101 compares address requests received from the system bus 11 with entries in its external cache 24 to generate snoop information for the system 100 (step 82). For each such comparison, if there is not a match, as tested by step 83, the CPU 101 forwards to the system bus 11 snoop information indicating that data specified by the address request is clean (step 84). Conversely, if there is a match in its external cache 24, the CPU 101 determines whether the specified data has been modified while stored in the external cache 24 (step 85). If the specified data has not been modified, the CPU 101 forwards clean snoop information to the system bus 11 (step 84). If, on the other hand, the specified data has been modified while in the external cache 24, the CPU 101 forwards to system bus 11 snoop information indicating that the specified data is dirty, and dispatches the updated specified data to the system bus 11 (step 86).

The CPUs 101A–101D continually monitor the system bus 11 for snoop information (step 87). If the snoop information indicates that specified data is dirty, as tested by step 88, the corresponding address request queued in the MRQ 122 is canceled, and updated data corresponding to the canceled address request is received from the system bus 11 (step 89). If, on the other hand, the snoop information indicates that the specified data is clean, the CPU completes the address request and associated read operation (step 90).

Although described above and depicted in the flow chart of FIG. 5 as comparing address requests received from the system bus 11 with entries in the external cache 24 before comparing with entries in the MRQ 122, in some embodiments the comparisons are performed simultaneously. In other embodiments, address requests received from the system bus 11 are compared with entries in he MRQ 122 before being compared with entries in the external cache 24.

The data buffer 124 within the memory interface unit 120 stores data retrieved from the primary memory 25 for which (1) its corresponding address request remains speculative, i.e., not yet validated with respect to bus ordering information and (2) snoop information is not yet available. Thus, for instance, if a speculative address request queued in the MRQ 122 is issued to the primary memory 25 before its valid bit is asserted by a corresponding read transaction on the system bus 11, the speculative data retrieved from the primary memory 25 remains in the data buffer 124 until either (1) a matching read transaction validates the data or (2) a matching write transaction cancels the data. If snoop results are not yet available for data retrieved from the primary memory 25, the data is stored in the data buffer 124 until either (1) clean snoop information is returned, in which case the data is forwarded to the CPU 101 via line 129 for processing or (2) dirty snoop information is returned, in which case the data is canceled. In one embodiment, the data buffer 124 is a RAM register file having 4 cache lines of data.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

We claim:

1. A method of processing data in a multiprocessor system, the method comprising:

generating an address request for a primary memory in response to a cache miss;

routing the address request directly from the cache to the primary memory as a speculative request;

issuing the address request to a system bus to establish data coherency information between the various processors;

receiving the data coherency information from the system bus; and selectively validating the speculative request in response to the data coherency information established on the system bus.

2. The method of claim 1, wherein the speculative request is validated by asserting one or more valid bits associated with the speculative request.

3. The method of claim 1, further comprising:

retrieving from the system bus snoop information provided by one or more of the processors in the system; and selectively canceling the speculative request in response to the snoop information.

4. A method of processing data in a multiprocessor system, the method comprising:

generating, within a selected one of a plurality of central processing units (CPUs) of the system, an address request for a primary memory in response to a cache miss;

routing the address request directly from the cache to the primary memory via the selected CPU as a speculative request;

issuing the address request to the plurality of CPUs via a system bus connected between the plurality of CPUs;

receiving a subsequent request from the system bus into the selected CPU;

if the subsequent request is the address request issued in response to the cache miss, validating the speculative request; and if the subsequent request is a write request to an address specified by the speculative request, canceling the speculative request.

5. The method of claim 4, further comprising:

queuing the speculative request in a memory read queue of the primary memory.

6. The method of claim 4, further comprising:

forwarding the speculative request to the primary memory to retrieve corresponding data.

7. The method of claim 6, further comprising:

storing the corresponding data in a data buffer until validated by snoop information.

8. A method of processing data in a multiprocessor system, the method comprising:

generating an address request for a primary memory in response to a cache miss;

issuing the address request from the cache to a system bus as a transaction to facilitate data coherency on the system bus;

routing the address request directly to the primary memory as a speculative request;

queuing the speculative request in the primary memory for retrieval of specified data from the primary memory;

monitoring the system bus for the transaction corresponding to the speculative request; and canceling the speculative request if a write request corresponding to the specified data is detected on the system bus before the transaction corresponding to the speculative request is detected on the system bus.

9. The method of claim 8, further comprising:

validating the speculative request if the transaction corresponding to the speculative request is detected on the system bus before a write request corresponding to the specified data is detected on the system bus.

10. The method of claim 8, further comprising:

retrieving from the system bus snoop information provided by one or more central processing units within the system bus; and selectively canceling the speculative request in response to the snoop information.

11. A computer system; having a plurality of central processing units (CPUs) connected to a system bus, each CPU connected to an associated primary memory and comprising:

a cache;

a cache controller connected to the cache and to the system bus;

a primary memory controller connected to the primary memory and to the cache controller, wherein the cache controller, in response to a cache miss, routes an address request directly from the cache to the primary memory controller as a speculative read request without accessing the system bus, the primary memory controller thereafter validating the speculative read request using data coherency information retrieved from the system bus.

12. The system of claim 11, wherein the address request comprises a transaction ID indicating which of the plurality of CPUs issued the address request.

13. The system of claim 11, wherein the speculative read request comprises one or more valid bits indicating whether the speculative read request is validated by the data coherency information.

14. The system of claim 11, wherein the primary memory controller further comprises a memory read queue to queue the speculative read request.

15. The system of claim 14, wherein the memory read queue comprises:

a CAM portion to store physical addresses for corresponding address requests to the primary memory; and a RAM portion to store one or more valid bits indicative of whether corresponding address requests are speculative requests.

16. The system of claim 11, wherein the cache comprises an external cache.

17. The system of claim 11, wherein the primary memory controller further comprises a write address queue to store write requests.

18. The method of claim 1, wherein the selectively validating comprises:

validating the speculative read request if the address request is received from the system bus before a write request for the same data is detected on the system bus.

19. The method of claim 1, wherein the selectively validating further comprises:

canceling the speculative read request if a write request for the same data is detected on the system bus before the address request is received from the system bus.

* * * * *